US005112157A

United States Patent [19]

Haarer

[11] Patent Number: 5,112,157

[45] Date of Patent: May 12, 1992

[54] FLEXIBLE CONNECTOR FOR CURTAIN RODS

[75] Inventor: Steven R. Haarer, Sturgis, Mich.

[73] Assignee: Cooper Industries, Houston, Tex.

[21] Appl. No.: 514,529

[22] Filed: Apr. 26, 1990

[51] Int. Cl.[5] ................ F16B 7/00

[52] U.S. Cl. ................ 403/292; 403/377; 403/295; 211/105.1; 248/265

[58] Field of Search ............ 403/4, 220, 291, 292-295, 403/341, 377; 248/253, 261-265; 211/105.1, 104, 105.2, 105.5

[56] References Cited

U.S. PATENT DOCUMENTS

| | | | |
|---|---|---|---|
| 320,244 | 6/1885 | Hammond | 248/261 |
| 1,148,252 | 7/1915 | Norwood | 211/105.5 |
| 1,177,580 | 3/1916 | McKenzie | 211/105.5 |
| 1,345,340 | 7/1920 | Alphin | 248/253 |
| 1,819,965 | 8/1931 | Horling | 211/105.1 X |
| 1,867,985 | 7/1932 | Prevost et al. | 248/253 |
| 2,765,581 | 10/1956 | Adler | 403/292 X |
| 4,068,346 | 1/1978 | Binder | 403/292 X |
| 4,145,150 | 3/1979 | Rafeld | 403/295 |
| 4,336,967 | 6/1982 | Hojo et al. | 403/291 |
| 4,369,000 | 1/1983 | Egnew | 403/220 X |
| 4,611,946 | 9/1986 | Gebelios | 403/291 X |
| 4,825,611 | 5/1989 | Bassett | 248/263 X |
| 4,846,205 | 7/1989 | Knoll | 403/291 X |
| 4,922,587 | 5/1990 | Pettit | 403/292 X |

FOREIGN PATENT DOCUMENTS

| | | | |
|---|---|---|---|
| 3744129 | 7/1989 | Fed. Rep. of Germany | 403/291 |
| 115181 | 10/1945 | Switzerland | 248/253 |
| 358236 | 10/1931 | United Kingdom | 211/105.5 |
| 200374 | 7/1933 | United Kingdom | 211/105.5 |

*Primary Examiner*—Andrew V. Kundrat
*Attorney, Agent, or Firm*—A. Triantaphyllis

[57] ABSTRACT

A flexible connector is disclosed for connecting one section of a curtain rod to another section of a curtain rod and for forming an easily adjustable transition corner between the two sections. The connector includes snaps and stops for locking the connection between the connector and the two curtain rod sections.

6 Claims, 3 Drawing Sheets

FLEXIBLE CONNECTOR FOR CURTAIN RODS

TECHNICAL FIELD OF THE INVENTION

The present invention relates to the field of curtain rods and, more particularly, to the field of connectors for connecting one section of a curtain rod to another section thereof. Still more particularly, the present invention discloses a flexible connector that facilitates the angular connection between two sections of a curtain rod, said angular connection being adjustable to conform with the requirements of the curtain rod installation.

BACKGROUND OF THE INVENTION

Curtain rods and connectors for connecting sections thereof in series are well known in the art. In most applications, curtain rods are comprised of one or more elongate straight sections connected in series and are used for hanging curtain panels on windows, walls, parts of buildings or the like for shielding light, improving the aesthetic appearance of a room, isolating a portion of a room or other similar purposes. Furthermore, curtain rods are used for hanging valances or the like over curtains for further aesthetic improvement. In certain instances, such as bay windows, corner windows or the like, the installation of a single rod is impractical or aesthetically undesirable; instead a separate rod is used for each section of such window or the rod is bent to form the transition corner from one section of the window to the adjacent section thereof. These methods have several disadvantages.

One disadvantage of the method utilizing a separate rod for each section is that it requires the use of several brackets and screws and the drilling of several holes in the wall. Another disadvantage is that a separate curtain panel is required for each separate rod.

One disadvantage of the rod-bending method is that such bending is time consuming and, sometimes, difficult. Another disadvantage is that the bending is oftentimes imprecise and difficult to conform with the configuration of the window.

The above disadvantages of the prior methods are overcome by the present invention which discloses a flexible connector for connecting sections of a curtain rod in an angular configuration to conform with the configuration of the installation. The use of more than one rod or the bending of the rod and the problems associated therewith are eliminated.

These and various objects and advantages of the present invention will become readily apparent to those skilled in the art upon reading the following detailed description and claims and by referring to the accompanying drawings.

SUMMARY OF THE INVENTION

Accordingly, the present invention discloses a flexible connector for connecting one section of a curtain rod to another section thereof in an angular configuration for installations of curtain rods in bay windows, corner windows or the like. The angle formed by the two sections which are being connected by the connector is readily adjustable to conform the installation of the curtain rod with the configuration of the window or the like.

The connector includes a middle portion which is sufficiently flexible to allow for the adjustment of the angle of connection between the two curtain rod sections from 0° to 360°. The connector further includes two end portions which are telescopically connectable with and conforming to the connecting ends of the curtain rod sections. The end portions include flexible snap lock means for locking the connection between the connector and the curtain rod sections being connected therewith. The connector also includes flanges for providing a stop to the telescopic advancement of the connector towards the rod sections beyond a predetermined point and vice versa.

BRIEF DESCRIPTION OF THE DRAWINGS

For a detailed description of the preferred embodiment of the apparatus of the present invention, reference will now be made to the accompanying drawings wherein.

DESCRIPTION OF THE PREFERRED EMBODIMENT

Figure 1:
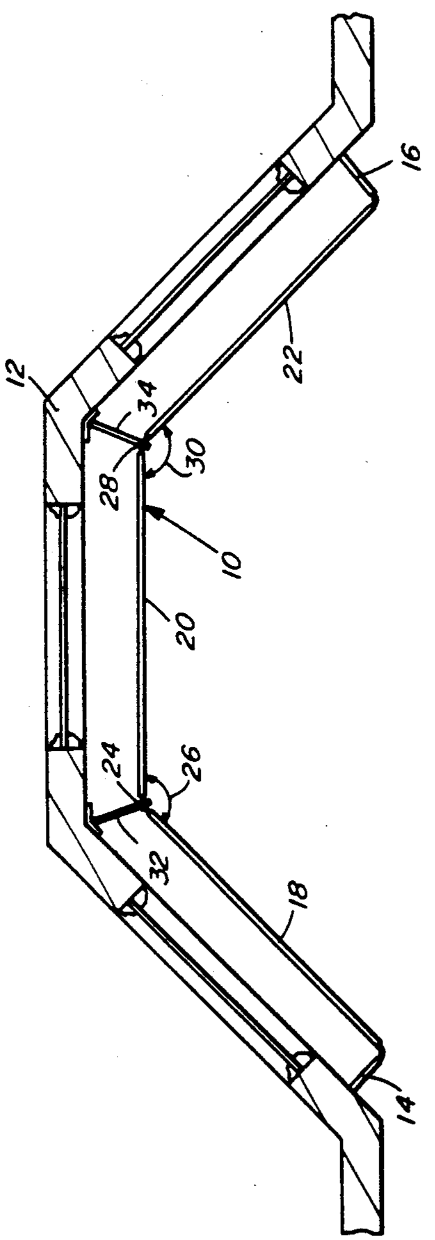
FIG. 1 is a top view of a curtain rod which is installed in a bay window, the curtain rod sections being connected by a connector made in accordance with the present invention.

According to the present invention, a flexible connector is disclosed for connecting a first curtain rod section to a second curtain rod section in an easily adjustable angular configuration. Referring now to FIG. 1, there is shown a curtain rod 10 attached to a bay window 12 via returns 14 and 16. Curtain rod 10 includes curtain rod sections 18, 20 and 22 connected in series. A flexible connector 24 connects curtain rod section 18 to curtain rod section 20 to form an angular connection 26 therebetween. Similarly, a flexible connector 28 connects curtain rod section 20 to curtain rod section 22 to form an angular connection 30 therebetween. Hook supports 32 and 34 engage connectors 24 and 28, respectively, to support curtain rod 20. Because of the flexibility of connectors 24 and 28, angular connections 26 and 30 are adjustable to conform the configuration of curtain rod 20 with the configuration of bay window 12. Curtain rod 20 is used for hanging a curtain panel, a valance or the like.

Figure 2:
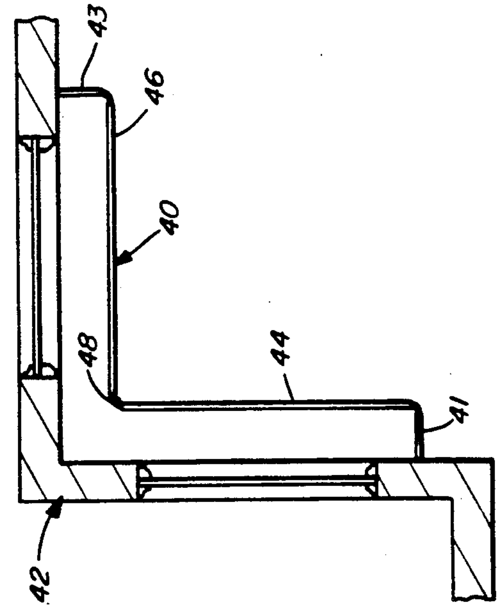
FIG. 2 is a top view of a curtain rod which is installed in a corner window, the curtain rod sections being connected by a connector made in accordance with the present invention.

Another use of the flexible connector in accordance with the present invention is shown on FIG. 2 wherein a curtain rod 40 is installed in a corner window 42. Curtain rod 40 is connected to the wall via returns 41 and 43. Curtain rod 40 includes a curtain rod section 44 being connected to a curtain rod section 46 via a flexible connector 48. Connector 48 is adjustable to conform curtain rod 40 with the configuration of corner window 42.

Figure 3:
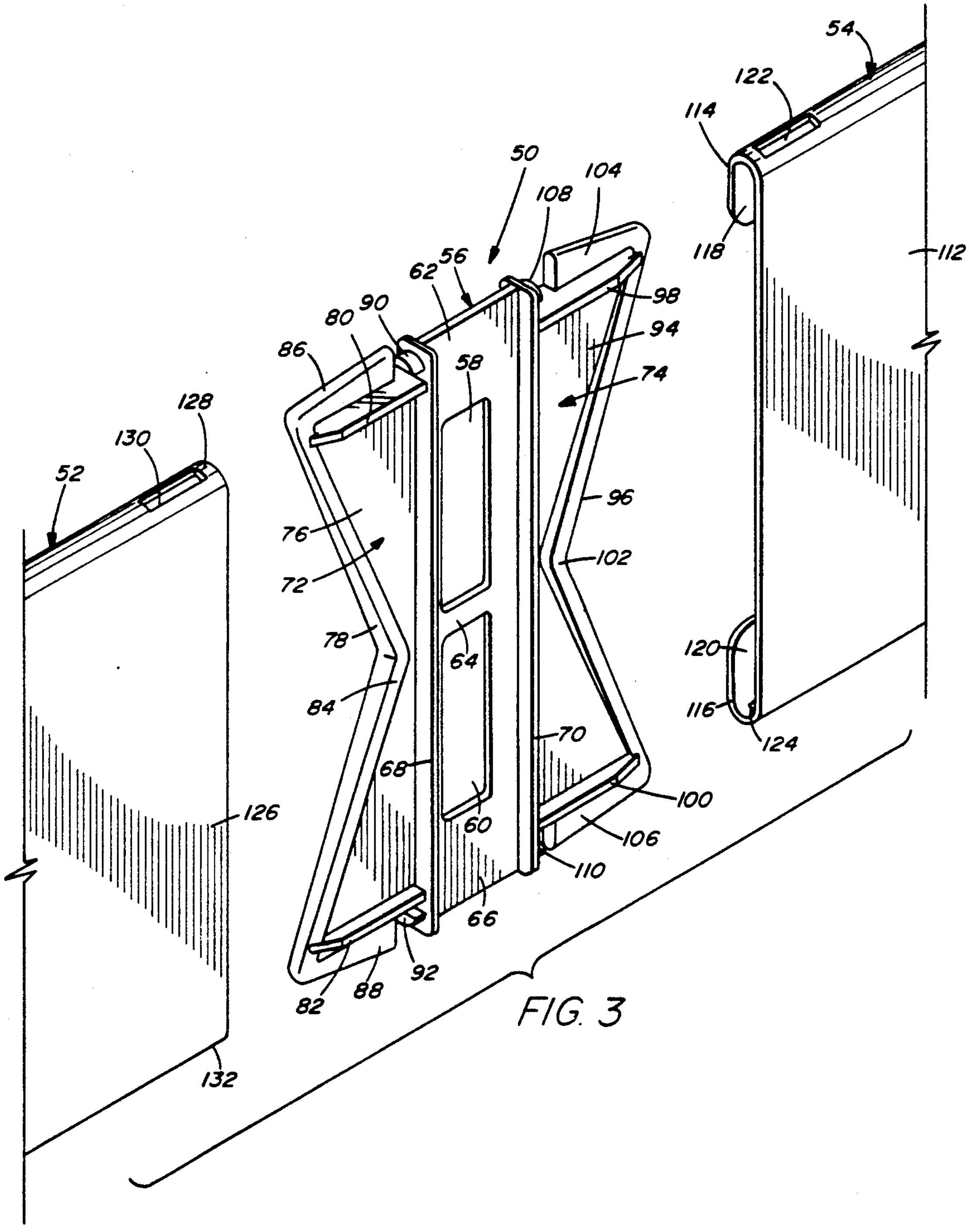
FIG. 3 is a fragmentary, front perspective view of a connector made in accordance with the present invention prior to connecting a first curtain rod section to a second curtain rod section.

Referring now to FIG. 3, there is shown a flexible connector 50 which is similar to the above referenced connectors 24, 28 and 48 prior to being connected to curtain rod sections 52 and 54. Flexible connector 50 includes a middle portion 56 having generally rectangular apertures 58 and 60, an upper web 62, a middle web 64 and a lower web 66, a flange 68 extending from one end of middle portion 56 and a flange 70 extending from another end of middle portion 56.

Connector 50 further includes a first connecting end 72 for connecting connector 50 to rod section 52 and a second connecting end 74 for connecting connector 50 to rod section 54. First connecting end 72 includes a generally flat section 76 having a V-shaped end 78, a horizontal upper rib 80 extending perpendicularly from flat section 76, a horizontal lower rib 82 extending perpendicularly from flat section 76, and a tapered rib 84 extending perpendicularly from flat section 76 along V-shaped end 78. First connecting end 72 also includes a flexible upper snap 86 and a flexible lower snap 88. Snaps 86 and 88 can be biased towards flat section 76 by applying a biasing force thereon and have sufficient elasticity so that they can return to their original unbiased position when no biasing force is applied thereon. First connecting end 72 also includes an upper extension 90 and a lower extension 92 which extend from flange 68. Extensions 90 and 92 have contour surfaces which conform with corresponding contour surfaces of rod section 52.

Second connecting end 74 is substantially similar to first connecting end 72. Accordingly, it includes a flat section 94 having a V-shaped end 96, upper and lower ribs 98 and 100, a tapered rib 102 along end 96, upper and lower snaps 104 and 106, and upper and lower extensions 108 and 110.

Rod section 54 includes a generally flat section 112 with reverse bent ends 114 and 116 which form channels 118 and 120, respectively, for receiving second connecting end 74. The trough of channel 118 includes a slot 122 for lockingly engaging upper snap 104 of second connecting end 74. The trough of channel 120 includes a slot 124 for lockingly engaging lower snap 106 of second connecting end 74.

Rod section 52 is substantially similar to rod section 54. It includes a flat section 126 with upper and lower reverse bent ends 128 and 132. End 128 forms a channel (not shown) having a slot 130 in the trough thereof. End 132 also forms a channel (not shown) with a slot (not shown).

Connector 50 is connected to second rod section 54 by slidingly inserting second connecting end 74 into second rod section 54. As second connecting end 74 advances in the interior of second rod section 54, the troughs of channels 118 and 120 apply a biasing force on upper and lower snaps 104 and 106, respectively, whereby upper and lower snaps 104 and 106 are biased towards flat section 94. When second connecting end 74 is sufficiently advanced in second rod section 54, upper and lower snaps 104 and 106 reach slots 122 and 124, respectively, and the end of rod section 54 abuts flange 70. In that position no biasing force is exerted on snaps 104 and 106 whereby the restoring force of snaps 104 and 106 causes them to snap into slots 122 and 124, respectively. Furthermore, in that position, flange 70 provides a stop which prevents the further advancement of connector 50 into second rod section 54. As a result, connector 50 lockingly engages second rod section 54. Second connecting end 74 and second rod section 54 are appropriately sized so that the troughs of channels 118 and 120 slidingly engage the corresponding contour surfaces on extensions 108 and 110, respectively, and the apex of tapered flange 102 abuts the interior surface of flat section 112. Similarly, connector 50 is lockingly connected to first rod section 52 by slidingly inserting first connecting end 72 into first rod section 52 until first rod section 52 abuts flange 68, upper snap 86 snaps into slot 130, and lower snap 88 snaps into the slot (not shown) of lower end 132. Ends 128 and 132 slidingly engage extensions 90 and 92, respectively, and the apex of tapered flange 84 abuts the interior surface of flat section 126 to stabilize the connection between connector 50 and first rod section 52.

Figure 4:
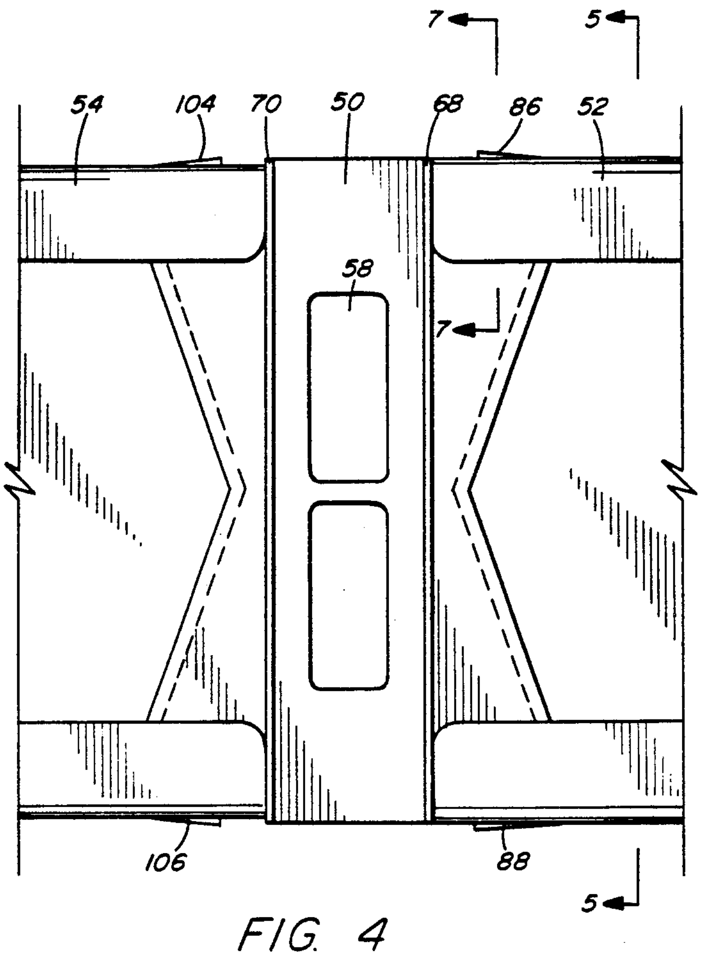
FIG. 4 is a fragmentary, rear elevation of the view of the connector of FIG. 3 connecting a first curtain rod section to a second curtain rod section.

Referring now to FIG. 4, there is shown a rear elevational view of first rod section 52 being lockingly connected to second rod section 54 via flexible connector 50. In that position, first rod section 52 abuts flange 68, second rod section 54 abuts flange 70, and snaps 86, 88, 104 and 106 snap into the corresponding slots (not shown). Referring now together to FIGS. 3 and 4, connector 50 may be disconnected from second rod section 54 by pressing upper and lower snaps 104 and 106 towards flat section 94 until snaps 104 and 106 are removed from slots 122 and 124, respectively, and slidingly removing connector 50 from second rod section 54. Similarly, connector 50 may be disconnected from first rod section 52 by biasing snaps 86 and 88 towards flat section 76 and slidingly removing connector 56 from first rod section 52.

In some applications, first connecting end 72 has the same dimensions as second connecting end 74 to connect first and second rod sections 52 and 54 having the same width. In other applications, however, the first and second connecting ends 72 and 74 are appropriately sized to connect first and second curtain rod sections 52 and 54 having different widths. For example, first and second connecting ends 72 and 74 may be appropriately sized to connect first and second curtain rod sections 52 and 54 having different widths in situations wherein first curtain rod section 52 is appropriately sized for a telescopic connection with second rod section 54 without a connector such as connector 50.

Figure 5:
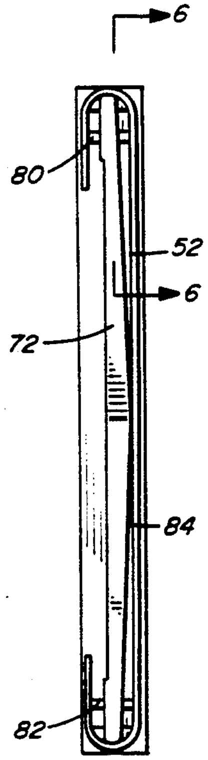
FIG. 5 is an elevational view taken along the plane of line 5—5 of FIG. 4.

Referring now to FIG. 5, there is shown an elevational view taken along line 5—5 of FIG. 4. First rod section 52 is connected to first connecting end 72. Ribs 80 and 82 and the apex of tapered flange 84 abut the interior surface of first rod section 52.

Figure 6:
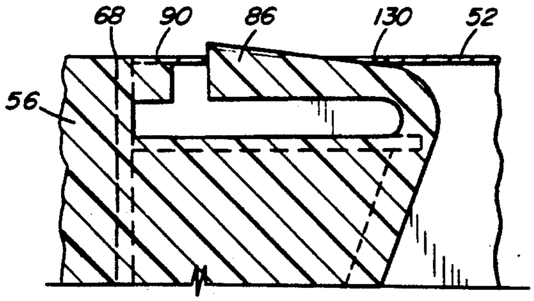
FIG. 6 is a fragmentary, cross sectional view taken along the plane of line 6—6 of FIG. 5.

FIG. 6 is a partial cross section taken along the plane of line 6—6 of FIG. 5 showing a portion of connector 56 being lockingly connected with first rod section 52. First rod section 52 abuts flange 68 and slidingly engages extension 90. Snap 86 is snapped into the locking position in slot 130.

Figure 7:
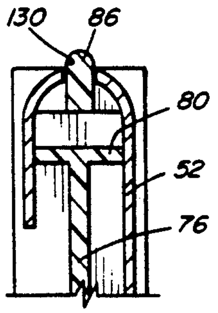
FIG. 7 is a fragmentary, cross sectional view taken along the plane of line 7—7 of FIG. 4.

FIG. 7 is a cross section taken along line 7—7 of FIG. 6. There is shown snap 86 lockingly inserted in slot 130 of first rod section 52. Rib 80 extends perpendicularly from flat section 76 and abuts the interior surface of first rod section 52.

Figure 8:
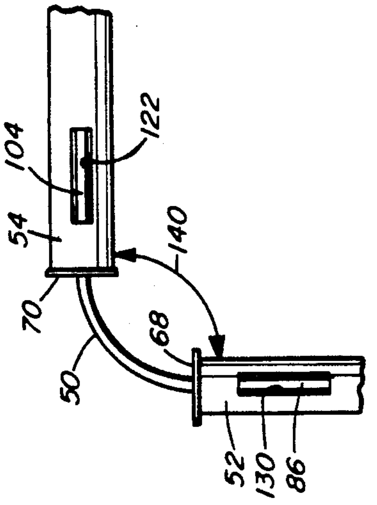
FIG. 8 is a fragmentary, top view of a connector made in accordance with the present invention connecting a first curtain rod section to a second curtain rod section.

FIG. 8 shows flexible connector 50 connecting first rod section 52 to second rod section 54. First rod section 52 abuts flange 68 and second rod section 54 abuts flange 70. Snap 104 is lockingly inserted in slot 122 and snap 86 is lockingly inserted in slot 130. Connector 56 is sufficiently flexed to form an angle 140 between first and second rod sections 52 and 54.

Connector 50 is constructed as one piece by molding a plastic material which is sufficiently flexible to effect the angular connection between the curtain rod sections 52 and 56 and sufficiently strong to support the loads encountered in installations of curtains, valances or the like. An example of such material is plastic material made out of polypropylene. It should be understood, however, that the construction of connector 50 may be modified as long as such modification includes a flexible section. For example, connector 50 may be constructed so as to include a flexible middle portion 56 with the remaining portions thereof being constructed of non-flexible plastic or metallic material.

The connection of first curtain rod section 52 to second curtain rod section 54 via connector 50 of the present invention is very stable. This stability is achieved by sufficiently inserting first connecting end 72 to first and sections 52 and second connecting end 74 to second and section 54; abutting flange 68, extensions 90 and 92, and ribs 80, 82 and 84 to first curtain rod section 52; abutting flange 70, extensions 108 and 110, and ribs 98, 100 and 102 to second curtain rod section 54; and locking the connection with snaps 86, 88, 104 and 106.

If the curtain rod is very long and/or the curtain panel, valence or the like is heavy, connector 50 provides for the installation of hook supports similar to hook supports 32 and 34 shown in FIG. 1. Referring to FIG. 3, a hook support (not shown) is attached on one end to the wall (not shown). The other end of the hook support is inserted into apperature 58 and web 62 rests on the hook support.

While a particular embodiment of the invention has been illustrated and described, various changes and modifications can be made by one skilled in the art without departing from the spirit and scope of the invention and it is intended to cover in the appended claims all such changes and modifications that are within the scope of this invention.

What is claimed is:

1. A connector for connecting a first curtain rod section to a second curtain rod section, the connector comprising:

a body having a substantially flat flexible portion;

a first flange extending from the body for providing a stop to a telescopic advancement of the first curtain rod section towards the connector;

a second flange extending from the body for providing a stop to a telescopic advancement of the second curtain rod section towards the connector;

first connecting means for telescopically connecting the body to the first curtain rod section;

second connecting means for telescopically connecting the body to the second curtain rod section;

first snap means extending from the first connecting means for lockingly connecting the first connecting means to the first curtain rod section; and second snap means extending from the second connecting means for lockingly connecting the second connecting means to the second curtain rod section.

2. A connector according to claim 1 wherein the body further includes an aperture for receiving a support hook.

3. A connector according to claim 2 wherein the body further includes a web above the aperture.

4. A connector according to claim 1 wherein the first and second connecting means includes means for stabilizing the connection between the body and the first and second curtain rod sections.

5. The connector according to claim 1 wherein the flexible portion is constructed of plastic material.

6. A connector for connecting a first curtain rod section to a second curtain rod section, the connector comprising:

a flexible and substantially flat middle portion having an aperture and a web;

a first flange extending from the middle portion for providing a stop to a telescopic advancement of the first curtain rod section towards the connector;

a second flange extending from the middle portion for providing a stop to a telescopic advancement of the second curtain rod section towards the connector;

a first connecting member conforming to a connecting end of the first curtain rod section;

a first snap extending form the first connecting member, the first snap being receivable in a first slot in the first curtain rod section;

a first rib extending from the first connecting member for stabilizing the connection between the connector and the first curtain rod section;

a second connecting member conforming to a connecting end of the second curtain rod section;

a second snap extending from the second connecting member, the second snap being receivable in a second slot in the second curtain rod section; and a second rib extending from the second connecting member for stabilizing the connection between the connector and the second curtain rod section.

* * * * *